United States Patent [19]

Kuthyar et al.

[11] Patent Number: 6,075,571
[45] Date of Patent: Jun. 13, 2000

[54] COMPOSITE IMAGE DISPLAY DEVICE AND SERVICE FOR VIDEO CONFERENCING

[76] Inventors: Ashok K. Kuthyar, 22 Riverside La., Holmdel, N.J. 07733; Ramarao Pemmaraju, 8 Ponderosa La., Old Bridge, N.J. 08857; Ram S. Mamamurthy, 231 Union Hill Rd., Manalapan, N.J. 07726; Peter H. Stuntebeck, 113 Woodbine Ave., Little Silver, N.J. 07739

[21] Appl. No.: 08/915,506

[22] Filed: Jul. 29, 1997

[51] Int. Cl.[7] .............................. H04N 9/74; H04N 7/15
[52] U.S. Cl. .................... 348/584; 348/588; 348/564; 348/15
[58] Field of Search ..................... 348/584, 588, 348/598, 599, 15, 16, 20, 385, 13, 17, 14, 563, 564; H04N 7/14, 7/15, 9/74

[56] References Cited

U.S. PATENT DOCUMENTS 4,931,872  6/1990  Stoddard .
5,280,540  1/1994  Addeo .
5,471,318  11/1995  Ahuja et al. ............................. 358/400
5,481,297  1/1996  Cash et al. ................................ 348/13
5,689,641  11/1997  Ludwig .................................... 348/15

Primary Examiner—Sherrie Hsia

[57] ABSTRACT

A network-based device creates composite video streams containing video images of users for display on video conferencing screens. Video image streams are cascaded through a series of quad boxes to create combined video streams and ultimately the composite video stream. The composite video stream produces a display grid comprised of a plurality of image boxes. The device uses quad box input port mapping to direct a specific video image stream to a specific image box by controlling the cascade path of each video image stream through the quad boxes in creating the composite video stream. A user interface permits a user to selectively determine the layout of user images on the video conferencing screen. Screen layout extends to size of each user image being incrementally controlled and location of each user image being selectively determined depending upon the size and the number of the various user images. By controlling size and location of each user image, the screen display area available for other uses, such as the display of applications programs, is increased.

18 Claims, 9 Drawing Sheets

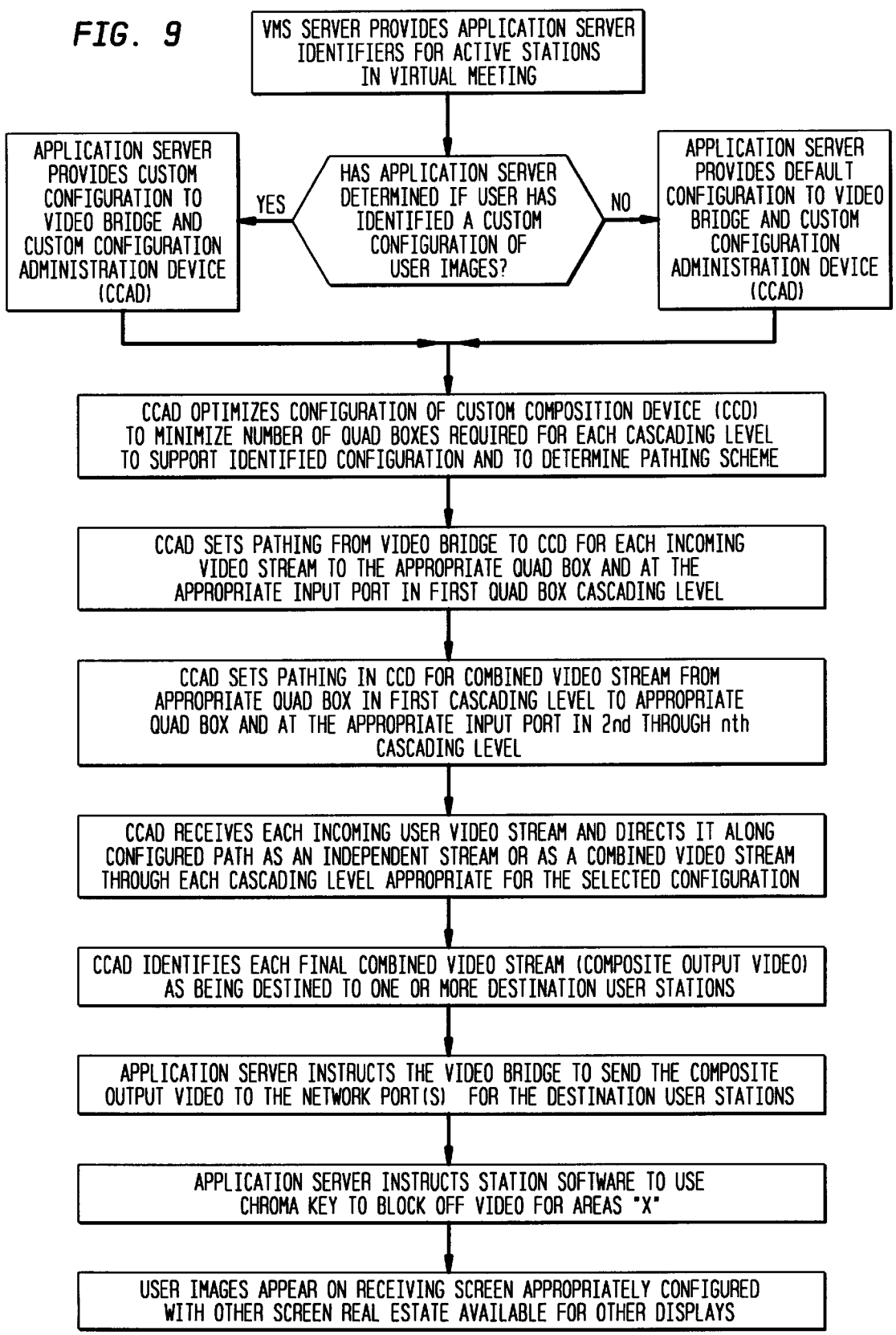

COMPOSITE IMAGE DISPLAY DEVICE AND SERVICE FOR VIDEO CONFERENCING

The present invention relates generally to video conferencing and more specifically to a network service providing the capability for the images of each participant to be selectively organized for display. The composite image display can be centrally organized or distributively organized, the latter approach allowing each participant to separately determine the composite image displayed at his conferencing station. The display is independent of the display on any other participant's video screen and is accomplished in the network rather than at each participant's conferencing station.

BACKGROUND OF THE INVENTION

A Virtual Meeting Service (VMS) is the concept of creating a multimedia meeting room environment virtually within an electronic network by bringing a group of people together without leaving their offices. A VMS allows participants to conference from their desktops using any of the audio, image, video and data combinations available at their conferencing station so that each has the capabilities he or she would otherwise have in a real face-to-face meeting.

Since VMS is a multi-point, multimedia communications service, bridging of audio, video and data streams is of paramount importance to the service. U.S. Pat. No. 5,471,318 to Ahuja et al. dated Nov. 28, 1995, (the '318 patent) describes a circuit configuration in a multimedia network representing a controllably persistent virtual meeting room which facilitates providing VMS.

As indicated in the '318 patent, prior approaches to these conferencing systems involved a plurality of complicated and expensive computer conferencing stations connected together by transmission facilities which act merely as a transport mechanism for whatever is to be communicated between conferencing stations. Each of the conferencing stations in these prior distributed environments contained a large amount of the multimedia data processing capabilities, including the necessary bridging and synchronization circuits.

The '318 patent provided an alternative to distributed environments, enabling a telecommunications carrier to provide a multimedia communications service through a shared multimedia work environment accessed by participants from a plurality of multimedia ports. By implementing the invention of the '318 patent, the bulk of the multimedia data processing capabilities, including the necessary bridging and synchronization circuits, become part of the communications network transmission facilities.

With establishment of a virtual meeting room using VMS, the conferencing stations of the participants in a virtual meeting room require the visual images to be displayed be satisfactorily organized on each conferencing station video screen. "Images" embraces any number of concepts but those routinely expected are the viewing of the participants in the virtual meeting room, the running of software applications programs which have image display, and a "chalk board" on which participants provide notes, annotations and the like.

A problem with conventional video-conferencing imaging is that participant image display is limited to displaying either a single, and the same, participant on every participant's video screen, or is limited to displaying only up to four participants, again all the same, on every participant's video screen. In conventional video-conferencing systems, typically, a codec and a transmission line is required for each participant to transmit into the video conference and a combiner and positioner is required for each participant to receive the various transmissions and combine the text/graphics computer output with the video which are then displayed visually on the receiving participant's video screen.

A problem with conventional systems is that when more than one participant needs to be displayed, multiple codecs and multiple transmission lines are required.

The inventors have observed that if there were a way to successfully combine the video streams from the different participants into a single video stream, this would markedly reduce the number of lines and hardware required since the bandwidth limitation of the transmission line remains constant regardless whether a single video stream or multiple video streams are being transmitted. The problem is how to maintain the image quality for the various video streams in a combined state with a minimum of equipment.

It is known that video streams can be combined in a "quad" box. A quad box takes four video streams and combines them into one video stream which can then be displayed on the video display screen. However, the quad box requires that an aspect ratio of height to width for each image of 3:4 be maintained causing the four-quadrant video image to take up the majority of the screen real estate and is typically centered in the screen as shown in FIG. 1.

A quad box approach may be an acceptable tool for "video and audio only" teleconferences where four participants only want to see one another. However, VMS is intended to be a multimedia teleconference approach, with the purpose being to permit participants to collaborate by passing information back and forth and have that information simultaneously displayed on each participant's screen. Unfortunately, a problem with the quad box is that it does not permit sufficient screen real estate to be available for data display, for example, to exchange text and provide markups or initiate a financial spreadsheet to which each participant can then contribute. Consequently, a quad box unsatisfactorily restricts the unbroken screen real estate which is necessary for use as a graphical or textual communications surface as part of VMS.

There is therefore a need in the art for a video conferencing screen display which provides composite video images of the participants, which is less limited as to the number of participants, which is customizable by each participant, and which is economical in usage of screen real estate thereby providing sufficient unencumbered screen real estate for text and graphics collaboration among participants. Moreover, there is a need for a solution which can augment VMS and which can be centrally based rather than distributed among participants.

Solution

These problems are solved and a major advance over the prior art is achieved by the instant invention which implements an analog approach to composite image display of participants.

A novel approach to ganging quad boxes within a communications network has been discovered by the inventors. Under this approach, a network server includes an Analog Video Bridge connected to an Analog Custom Composite Module. The Analog Custom Composite Module incorporates and uses multiple quad boxes to receive and moderate the video input streams of the participants. The multiple quad boxes are ganged and controlled by the Analog Custom Composite Module in such a fashion that the video stream of each participant can be selectively input to a specific input port on a specific quad box and the output video stream from each quad box can be selectively provided as input to another quad box, in effect controllably cascading and combining each video image with others to reduce the size of each video image and control the location of each video image on each participant's screen.

Consider, as a example, that a first quad box combines up to four video input streams into a single video input stream and the combined image stream so generated would normally be displayed in four quadrants on a receiving video screen occupying the balance of the screen real estate as shown in FIG. 1. However, applying the instant invention, the combined image stream generated as output from the first quad box can be combined with another image stream generated as output by a second quad box by sending both image streams to a third quad box. The third quad box combines the image streams from the first and second quad boxes into a single combined image stream and this twice-combined stream is then sent to the selecting participant. This ganging arrangement permits each quadrant of a four quadrant display to be split into four quadrants as well. Thus, up to sixteen participants can be displayed at a time on a participant's screen.

Normally, this display would occupy the bulk of video screen real estate. However, the present invention novelly recognizes the combination of the combined video stream with Chroma Keying which permits display boxes which are not being used to be turned off and this screen real estate used to display other data.

Further increases in the number of participant's images displayed and further reduction in the size of images are possible by incorporating additional quad boxes. For example, further serial ganging to a fourth quad box will produce images which are $\frac{1}{64}$th screen size. However, because image quality is affected by image size and the number of screen pixels used to display the image, continued quad box ganging may not produce a sufficiently clear image for easy viewing.

Moreover, the instant invention permits the image size of a participant to be different form the image size of other participants. This is accomplished by changing the number of quad boxes that one or more of the participants' images are cascaded through relative to the number of quad boxes one or more other participants' images are cascaded through. For example, a first participant's image can be shown in $\frac{1}{4}$th size while other participants are shown in $\frac{1}{16}$th size by introducing the image streams for the other participants as input to a first quad box and introducing the combined video stream generated by the first quad box as input to a second quad box which is the first quad box to which the image stream of the first participant is introduced as input. This will result in the other participants being displayed on the screen in $\frac{1}{16}$th size and the first participant being shown in $\frac{1}{4}$th size. This configuration limits to twelve the number of other participants. Similarly, other differences in size can be achieved by adding one or more additional cascades for selected participants through additional quad boxes permitting some participants to be shown as large as $\frac{1}{4}$th size while others could, for example, be shown in $\frac{1}{16}$th size and still others shown in $\frac{1}{64}$th size.

The input port to which a participant image is directed on each quad box used in the custom composition device determines the relative placement of that participant's image with respect to all other participants' images and with respect to the left and right and up and down orientation of the display screen real estate. Because an input port of a quad box will always display the image input to that port in a specific and determined quadrant of the four quadrants produced by the quad box and because those four quadrant displays sent as an input stream to a second quad box will always occupy a specific and determined quadrant of the four quadrants produced by the second quad box and so forth, an image can be selectively directed to appear in a desired image box on the display screen. Thus the instant invention is not only able to control image size but is also able to control image location on the display screen.

In accordance with one aspect of our invention, in a VMS environment, an custom composition device comprised of multiple quad boxes is provided centrally in the communication network to selectively control the size and location of each participant image on a conference station screen.

In accordance with another aspect of our invention, initial participant image streams are sent within the custom composition device to a first quad box location device and the combined image streams created at the first quad box location are sent to a second quad box location whereby each participant's image in the combined image stream output is reduced to approximately $\frac{1}{16}$th original size.

In accordance with a further aspect of our invention, the combined image streams created at the second quad box location are sent to a third quad box location whereby each participant's image in the combined image stream output is reduced to approximately $\frac{1}{64}$th original size.

In accordance with a still further aspect of our invention, the reduction in a participant's image size is determined and controlled by the number of quad boxes through which the participant's image stream is serially passed.

In accordance with yet another aspect of our invention, the location of a participant's image displayed on a screen is controllably determined by the input port at which the image stream, in combined and uncombined form, is serially presented to the quad boxes 1–n before being displayed.

In accordance with a yet further aspect of our invention, the size of one or more participants' images can be controllably varied from the size of one or more other participants' images by selectively varying the number of quad boxes to which one or more participants image streams are presented relative to the number of quad boxes to which one or more other participants image streams are presented.

DESCRIPTION OF THE DRAWINGS

FIG. 9 is a flow diagram of the control and processing by the invention elements to achieve a desired participant image display on a screen.

DETAILED DESCRIPTION OF THE INVENTION

Figure 1:
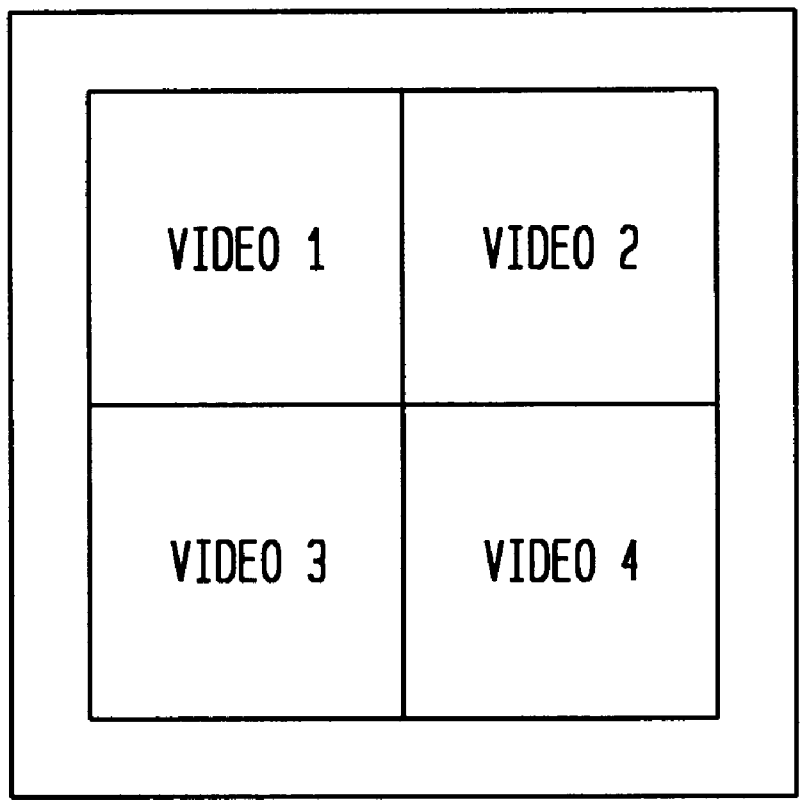
FIG. 1 is an illustration of a characteristic four quadrant display produced by a single quad box on a display screen.
Figure 2:
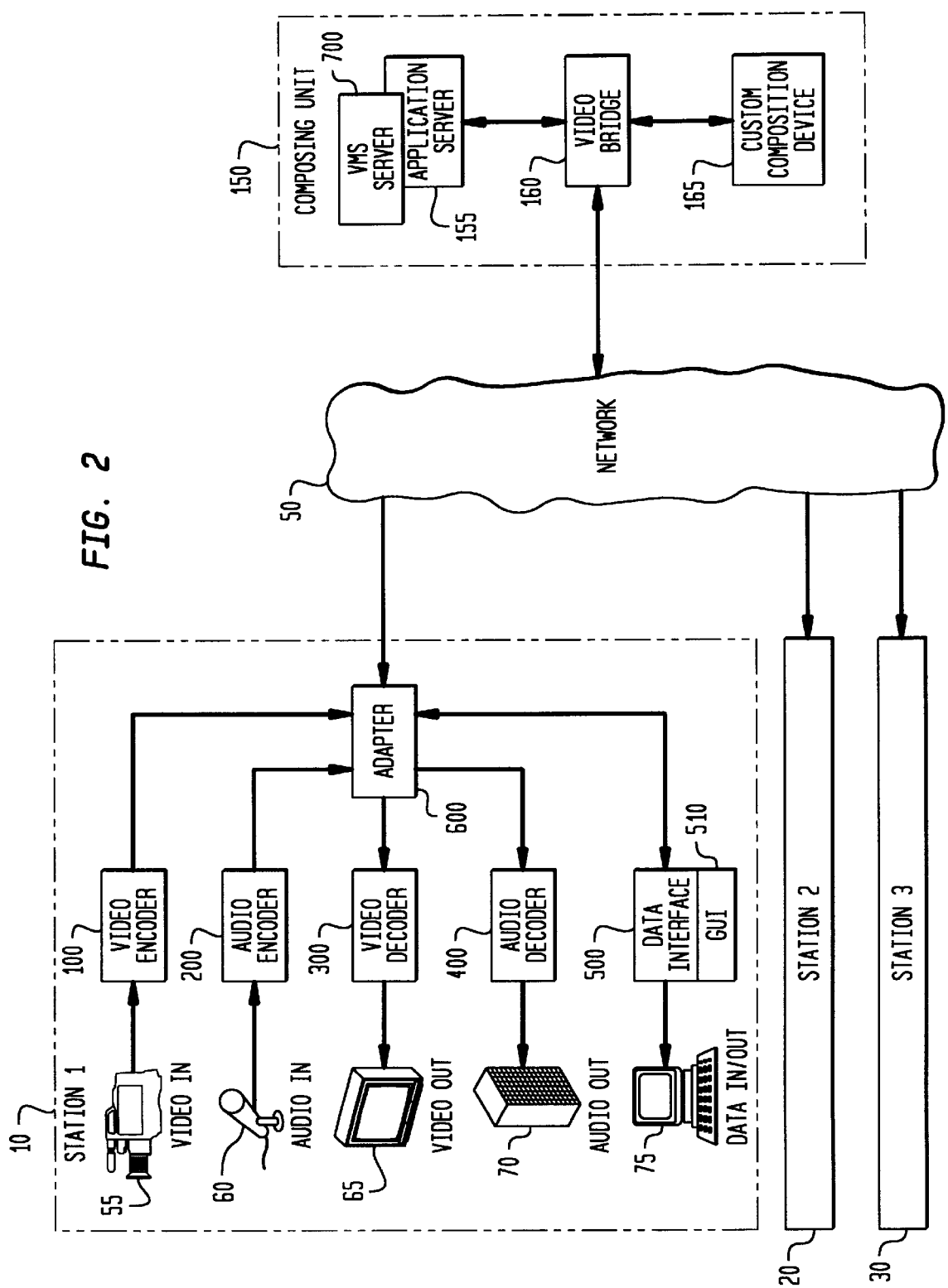
FIG. 2 is a schematic illustrating the architecture of each video conferencing station and its interface to the network and the VMS server.

Referring to the drawings, there is shown in FIG. 2 a schematic of the architecture of the present invention.

As shown in FIG. 2, a plurality of video conferencing stations, identified as stations 1,2, . . . n, are necessary for users A,B–Z to participate in a virtual meeting. Each station 1–n is coupled to a network system 50 through a transport medium 40. The particular transport medium is not limited to telephone network or wire transmission media. Rather, any transport may be used, such as asynchronous transfer mode (ATM), integrated services digital network (ISDN), local area network (LAN), wireless media or other transport media. In the present invention, each virtual meeting established for the users A–Z at the video conferencing stations 1–n is maintained and controlled by a VMS application server 700 resident in the network 50.

As shown in FIG. 2, the typical inpoint telecommunications facility architecture of any station 1–n, is a video recording device 55 coupled to a video encoder 100; an audio recording device 60 coupled to an audio encoder 200; a video output device hereafter called a screen 65 connected to a video decoder 300; an audio output device 70 connected to an audio decoder 400 and a data processing unit 75 for data input and output connected to a data interface 500 and a Graphical User Interface (GUI) 510, the former involved in data manipulation and the latter controlling screen image composition.

Each of the encoders, decoders and interfaces are, in turn, coupled to an adapter card or an adapter board 600, as shown in block 10 of FIG. 2. Adapter 600, which can be a circuit board or card for installation in a computer or server (not shown), serves to multiplex and de-multiplex all of the individual signals onto a communication line or transport medium 40.

Video conferencing stations 1–n may, but need not, have similar inpoint architectures as the environment of any other station 1–n. The advantage of having similar architectures is that each user at each conferencing station 1–n will have the same conferencing capabilities as every other user and thereby be able to equally participate in the discussions and collaborations.

Figure 3:
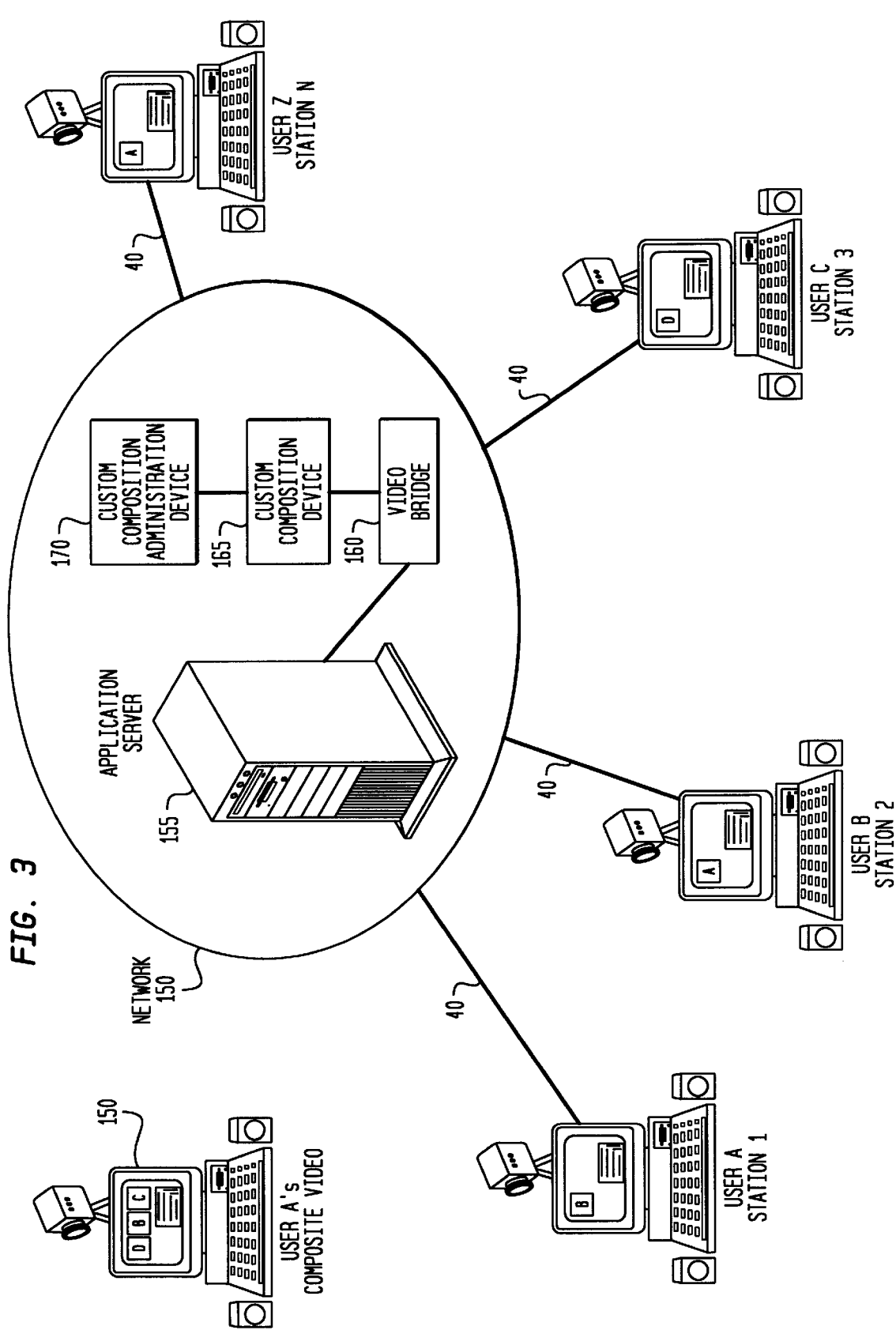
FIG. 3 is a schematic illustrating the elements of a Virtual Meeting Service implementing the approach of the instant invention to customizing image display.

As part of the invention, a subsystem of components, referred to hereafter as the composing unit 150, is located in network 50 as shown in FIGS. 2&3. As shown in FIG. 2, the communication line 40 from the transport medium enters the composing unit 150 through a video bridge 160. Video Bridge 160 is controlled by an VMS application server 155. Custom composition device 165 is linked to video bridge 160. Custom composition device 165 moderates incoming video streams and determines video stream output through the video bridge 160 back to the various stations 1–n as directed and controlled by custom composition administration device 170 shown in FIG. 4.

Figure 4:
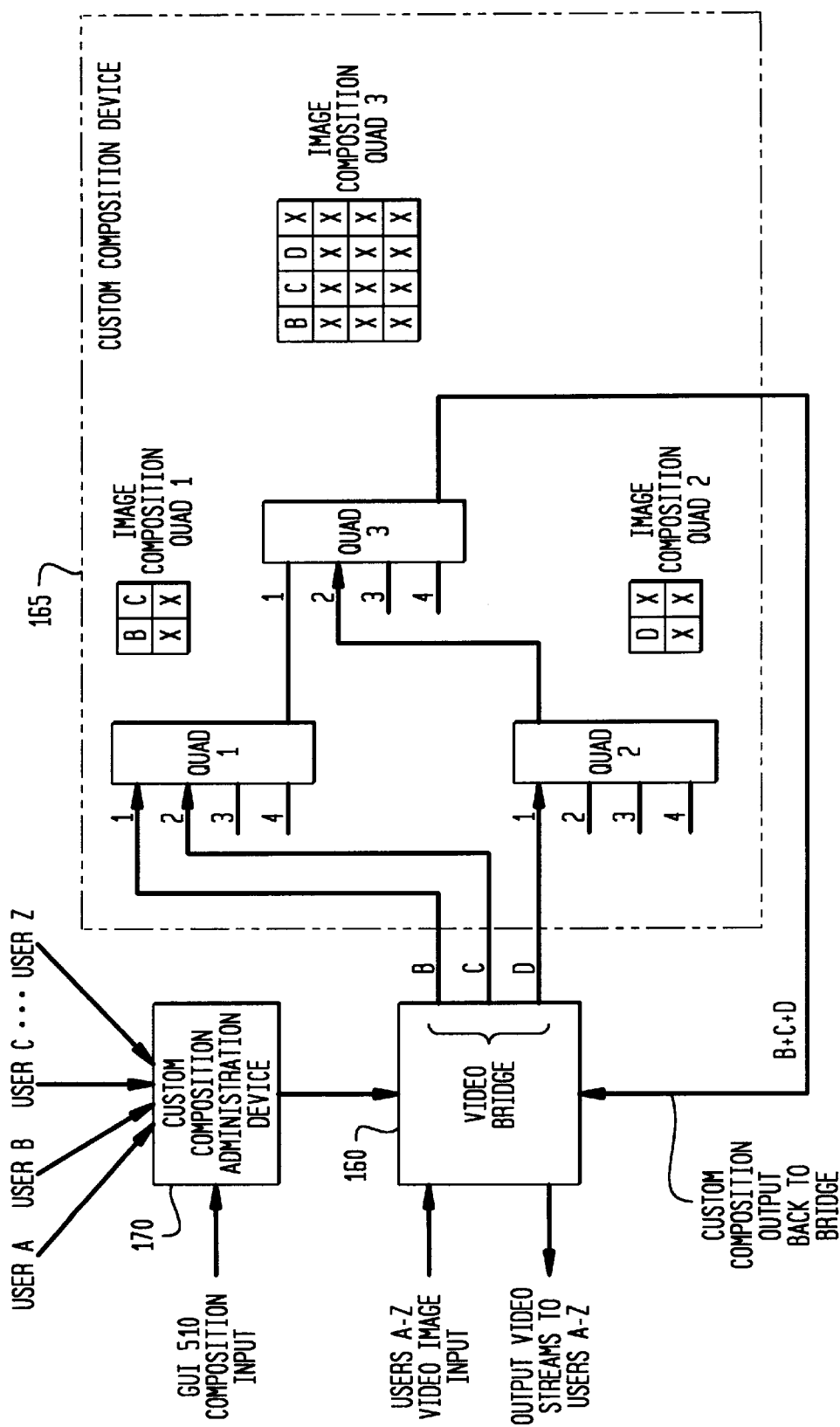
FIG. 4 is a schematic of the architecture of the instant invention resident in a network and using quad box ganging at two cascade levels to produce composite images on a participant's screen.

A custom composition device 165 comprised of three quad boxes constituting two image reduction/placement levels is illustrated in FIG. 4. As shown in FIG. 4, video bridge 160 receives video input streams from the various stations 1–n. Each video stream is identified with its originating conferencing station and user and therefore will share the user's identifier A–Z. For the purpose of illustration, three input streams B,C & D are shown as being manipulated. Video bridge 160 sends the input streams B,C &D to specific input ports 1–4 on quad boxes Quad 1, Quad 2 and Quad 3 as dictated by custom composition administration device 170.

While the relative position and size of each user's video image can be locked or "hard-wired" into the custom composition device 165, in the preferred embodiment, the relative position of each user's video image is selectively determined. Selection can be either by each recipient user or by a system administrator controlling the VMS, in either instance directing the selection to the custom composition administration device 170. In the preferred embodiment, a Graphical User Interface (GUI) 510 permits a user to compose the size and layout of the user images on his/her screen through a series of prompts and icon selections. Let us assume that the default layout is to be set such that each user image is to occupy an image box approximately 1/16th size and that user image boxes are to proceed from the top left corner of the screen and be ordered from left to right along the top of the screen. Once a line of user image boxes is completed from left to right a second line is started directly beneath it, again proceeding from left to right, and so forth from the top to the bottom of the screen. This configuration is illustrated in FIG. 4 by the box labeled Custom Composition Quad 3.

To create this configuration the GUI 510 polls the VMS server 700 to determine the number of and the identity of the active stations participating in the virtual meeting. In the preferred embodiment in the default mode, the GUI 510 will direct the composing unit 150 to place the user images in ranked order of sending station, omitting the image sent by the receiving station. Assuming that there are 4 meeting participants with user A at station 1, user B at station 2, user C at station 3 and user D at station D and addressing the display for user A at station 1, the other three users are to be displayed in 1/16th size with the images of users B,C & D appearing in order from left to right starting at the top of user A's screen as illustrated in the box labeled Image Composition Quad 3. Absent a default, user A could likewise select this configuration.

The default setting or the composition selections made by each user A–Z through GUI 510 are directed to the composing unit 150 and specifically to custom composition administration device 170 resident in composing unit 150. In the preferred embodiment, the custom composition administration device is software-based and resides on the application server 155 as a signal traffic controller which, for each user A–Z, directs the incoming video image streams from each user A–Z to a specific sequence of quad boxes 1–n and to a specific input port 1–4 on each quad box. By being software based, the custom composition administration device 170 is able to be preprogrammed with a default configuration of video images and that configuration selectively altered by a user both prior to commencement of the video conference and at any time during the session of the video conference. Likewise, entry of users to and departure of users from the virtual meeting room created by the VMS server 700 are recognized by the custom composition device 165 which compensates by rearranging images automatically in the default mode.

Recognizing that the composition of images described above for the default mode can likewise be a customized selection made through the GUI 510, the creation of the desired screen composition at user A's station will now be described in relation to the continuing example of four users A–D in which the image of the other three users are to be displayed in ¹/₁₆th size on each user's screen. In this example, the custom composition device 165 requires the participation of only three of its resident quad boxes, although custom composition device 165 may be comprised of a larger number of quad boxes. Each participating quad box is capable of placing an input video image in one of four quadrants created by the quad box. The quadrant in which an input video image is placed is determined by the quad box input port 1–4 to which the incoming image stream associated with the video image is provided. This determination is always constant, thus, for example, an image stream sent to input port 1 will always result in the image being placed in the northwest quadrant; an image stream sent to input port 2 will always result in the image being placed in the northeast quadrant; an image stream sent to input port 3 will always result in the image being placed in the southwest quadrant; and an image stream sent to input port 4 will always result in the image being placed in the southeast quadrant of the 4 quadrant grid created by the quad box. Having a combined video stream created by a first quad box sent to second quad box likewise has the same certainty of image location in the grid created by the second quad box. Assuming that the combined video stream is sent to input port 1 of the second quad box, results in the four quadrant grid created by the first quad box appearing in the northwest quadrant of the grid created by the second quad box. By ganging a third, fourth and fifth quad box in parallel with the first quad box and causing each to send its respective combined image stream to an input port on the second quad box, the second quad box will have each of its four quadrants comprised of the four quadrants created by one of the quad boxes in the first level of the image cascade. Thus 16 image locations or image boxes are created having the potential to be filled with a user image.

Applying this to the instant example in which the images of users B,C&D are to be displayed from left to right and top to bottom on user A's screen, the benefit and facility of the instant invention is disclosed. Referring to FIG. 4, custom composition administration device 170 causes the image stream for user B to be sent to port 1 of Quad 1 and the image stream for user C to be sent to port 2 of Quad 1. This results in a combined image stream in which the image streams for users B and C occupy the positions shown in the box titled Image Composition Quad 1. Similarly, custom composition administration device 170 causes the image stream for user D to be sent to port 1 of Quad 2. This results in a combined image stream in which the image stream for user D occupies the position shown in the box titled Image Composition Quad 2. Custom composition administration device 170 causes the combined image stream from Quad 1 to be sent to input port 1 on Quad 3 and the combined image stream from Quad 2 to be sent to input port 2 on Quad 3. This causes the four quadrant grid of Quad 1 to occupy the northwest quadrant of the four quadrant grid created by Quad 3 and the four quadrant grid of Quad 2 to occupy the north east quadrant of the four quadrant grid created by Quad 3. This cascading combining of video streams results in a combined video stream which will cause the images of users B,C&D to appear in the positions shown in the box titled Image Composition Quad 3. Directing the combined image stream created by Quad 3 back to video bridge 160 and transmitting that stream as output from the composing unit 150 to user A's station, as can be seen, causes the images to appear on user A's screen alphabetically arranged from left to right along the top.

Consequently, the instant invention is quite robust and facile. For example by involving another quad box, let us call it Quad 4, at a subsequent cascading level to receive input from quad boxes at the second cascading level of which Quad 3 is representative, permits the 16 potential image boxes created by Quad 3 to occupy a single quadrant in the four quadrant grid created by Quad 4 and if three other quad boxes also at the second cascading level also feed combined video image input to the remaining three input ports of Quad 4, Quad 4 produces a grid having a potential of 64 image boxes (4×4×4). This cascading of combined video images can be continued indefinitely with each subsequent quad box increasing the potential available image boxes by a multiple of 4. Obviously, the smaller the image boxes, the more the image will degrade and may not produce images suitable for viewing. In the preferred embodiment of the present invention quad box series ganging is limited to three cascading levels to provide the potential for up to 64 image boxes.

Figure 5:
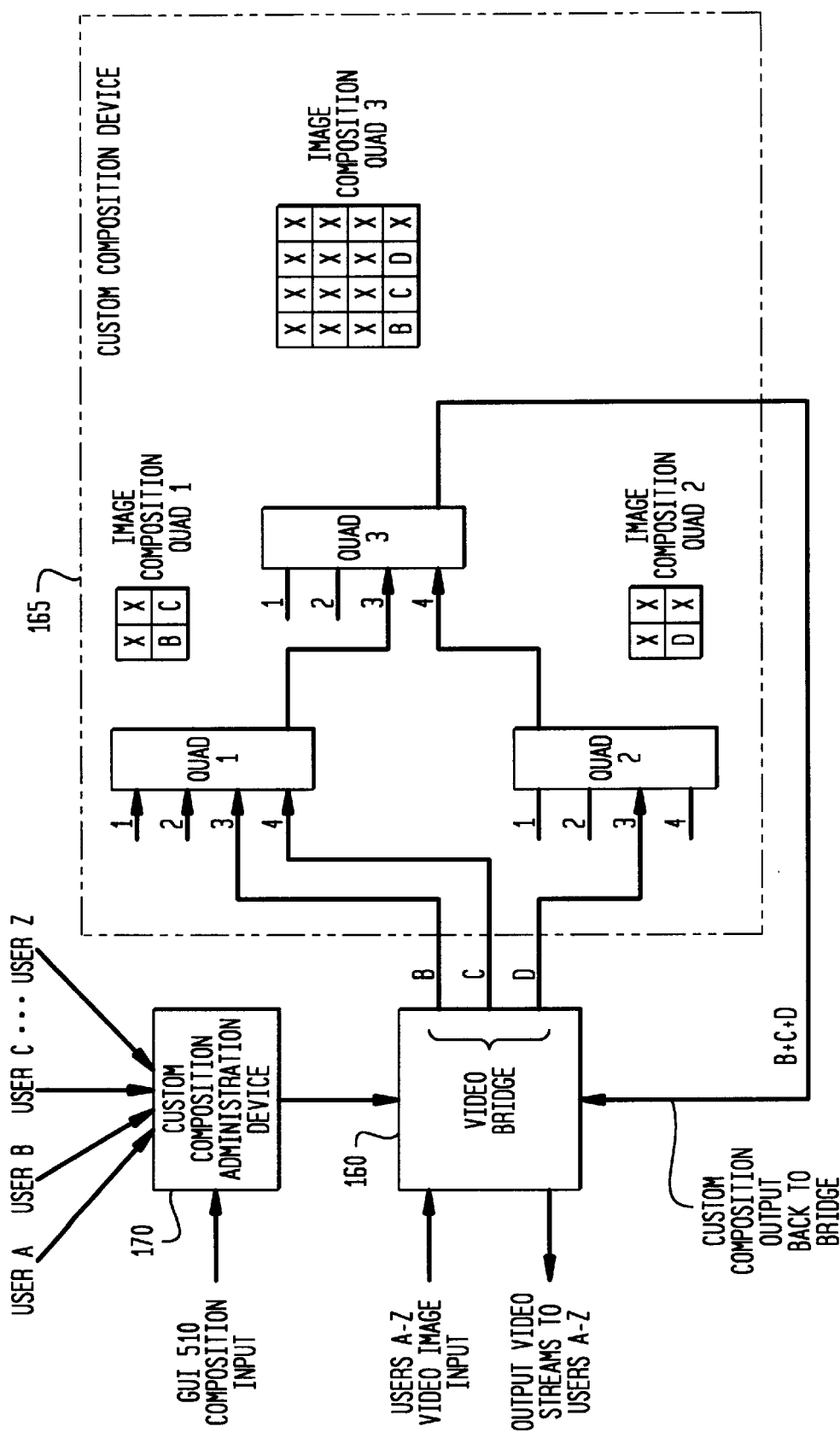
FIG. 5 is a schematic of the architecture and pathing of the instant invention to produce participant images in a row along the bottom of a participant's screen.

Assume that user A wishes to have user images appear at the bottom rather than the top of his/her screen. By proper icon selection of the desired configuration user A causes GUI 510 to inform custom composition administration device 170 of the desired configuration and custom composition administration device 170 provides a pathing solution to custom composition device 165 to implement. For example, consider that custom composition administration device 170 has provided the pathing solution illustrated in FIG. 5. Rather than directing video streams for user B and C to Quad 1 input ports 1 and 2, respectively, custom composition device 165 directs them to Quad 1 input ports 3 and 4, respectively. This results in the image location for users B and C to be, respectively, in the southwest quadrant and southeast quadrant of the combined image stream created by Quad 1 as is shown in the box titled Image Composition Quad 1. Similarly, the video stream for user D is directed to input port 3 of Quad 2. This results in the image location for user D to be in the southwest quadrant of the combined image stream created by Quad 1 as is shown in the box titled Image Composition Quad 2. Custom composition device 170 directs the combined image stream from Quad 1 to input port 3 of Quad 3 which places the four quadrant grid created by Quad 1 to appear in the southwest quadrant created by Quad 3. Similarly, custom composition device 170 directs the combined image stream created by Quad 2 to input port 4 of Quad 3 which places the four quadrant grid created by Quad 2 in the southeast quadrant created by Quad 3. Thus, the combined image stream created by Quad 3 results in the images of users B,C&D to appear along the bottom of user A's screen from left to right.

Image sizes of the users can be further reduced while maintaining on-screen positioning of the images by sending the combined image stream created by Quad 3 to another quad box Quad 4 (not shown) at input port 3 which will result in the grid of sixteen image boxes created by Quad 3 to occupy the southwest quadrant of the four quadrant grid created by Quad 4. This results in each image box being reduced to ¹/₆₄th full image size while remaining presented from left to right along the bottom of user A's screen.

As mentioned above, the number of quad box cascading levels controls the number and the size of the image boxes available at a user's screen. Beneficially, the present invention does not require that all image boxes need be occupied. Moreover, the present invention causes each unused image box in the final combined image stream grid generated by custom composition device 165 to be suppressed by the composing unit 150 utilizing Chroma Keying, a capability well known in the art. Thus, at the time of image display on user A's screen, the screen real estate which would otherwise have been occupied by unused image boxes is freed up for display of, for example, an application program's output on this portion of user A's screen.

Also beneficially, the instant invention permits user images to be selectively varied in size. For example, assuming there are five users, that each user is to be displayed on every other user's screen and that the smallest image size is to be 1/16th full size, one or more of the user's images can be increased to quarter size. This is accomplished by the user selecting the appropriate image or images to be enlarged and the location each enlarged image is to occupy using GUI 510. GUI 510, in turn, causes custom composition administration device 170 to direct custom composition device 165 to suitably arrange the output.

Figure 6:
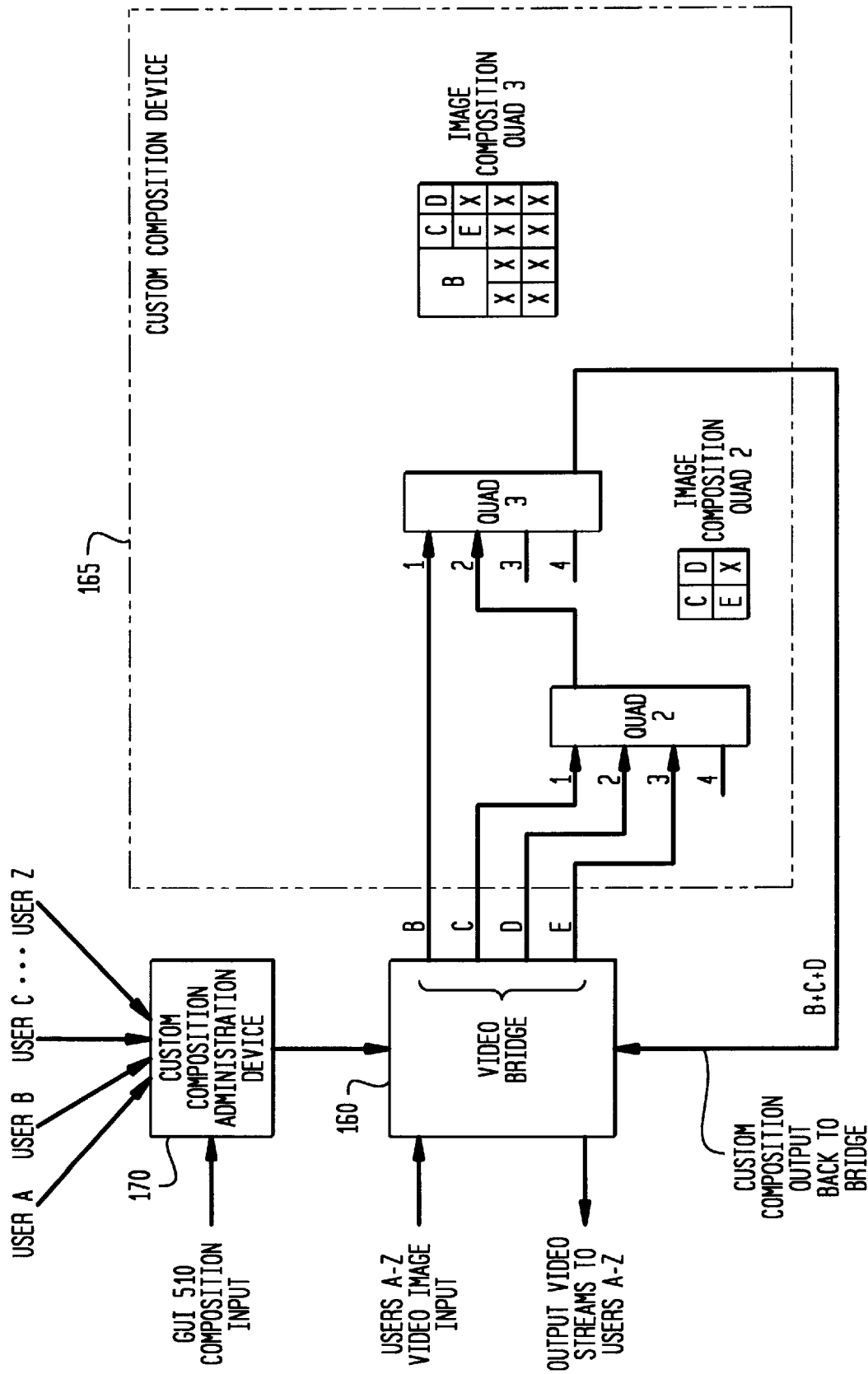
FIG. 6 is a schematic of the architecture and pathing of the instant invention to produce participant images along the top of a participant's screen in which one of the participants' images is larger than the others.

For example, the user A can direct that the images of users B,C,D&E appear on his/her screen all in 1/4th size. This is easily accomplished by custom composition device 165 cascading each image stream to the appropriate port of a single quad box. However, this will result in the four images occupying all screen real estate on user A's screen. Next assume that user A wishes that the image of user B appear at 1/4th size in the top left corner of user A's screen and user C,D,&E are to proceed from left to right in 1/16th size after user B's image. Referring to FIG. 6, this is easily accomplished by custom composition administration device 170 directing the video stream for user B to input port 1 of Quad 3 in custom composition device 165 causing the image of user B to occupy the northwest quadrant of the four quadrant grid created by Quad 3, thus being shown in 1/4th size. On the other hand, custom composition administration device 170 controls the pathing within custom composition device 165 for video streams for users C,D,&E such that they are sent respectively to input ports 1,2&3 of Quad 2 causing the user images to occupy the positions shown in the box titled Image Composition Quad 2. The combined image stream of Quad 2 is directed by custom composition administration device 170 to input port 2 of Quad 3 causing the image stream from Quad 2 to occupy the northeast quadrant of the grid created by Quad 3. This will cause the user images to occupy the positions shown in the box titled Image Composition Quad 3 when displayed at user A's station. The instant invention is capable of changing image size "on the fly" meaning that at any time the instant invention can change a specific image size by changing video stream pathing within custom composition device 165. The instant invention also permits size adjustment to occur not only upon selection by a user but also, for example, when a user speaks.

Figure 7:
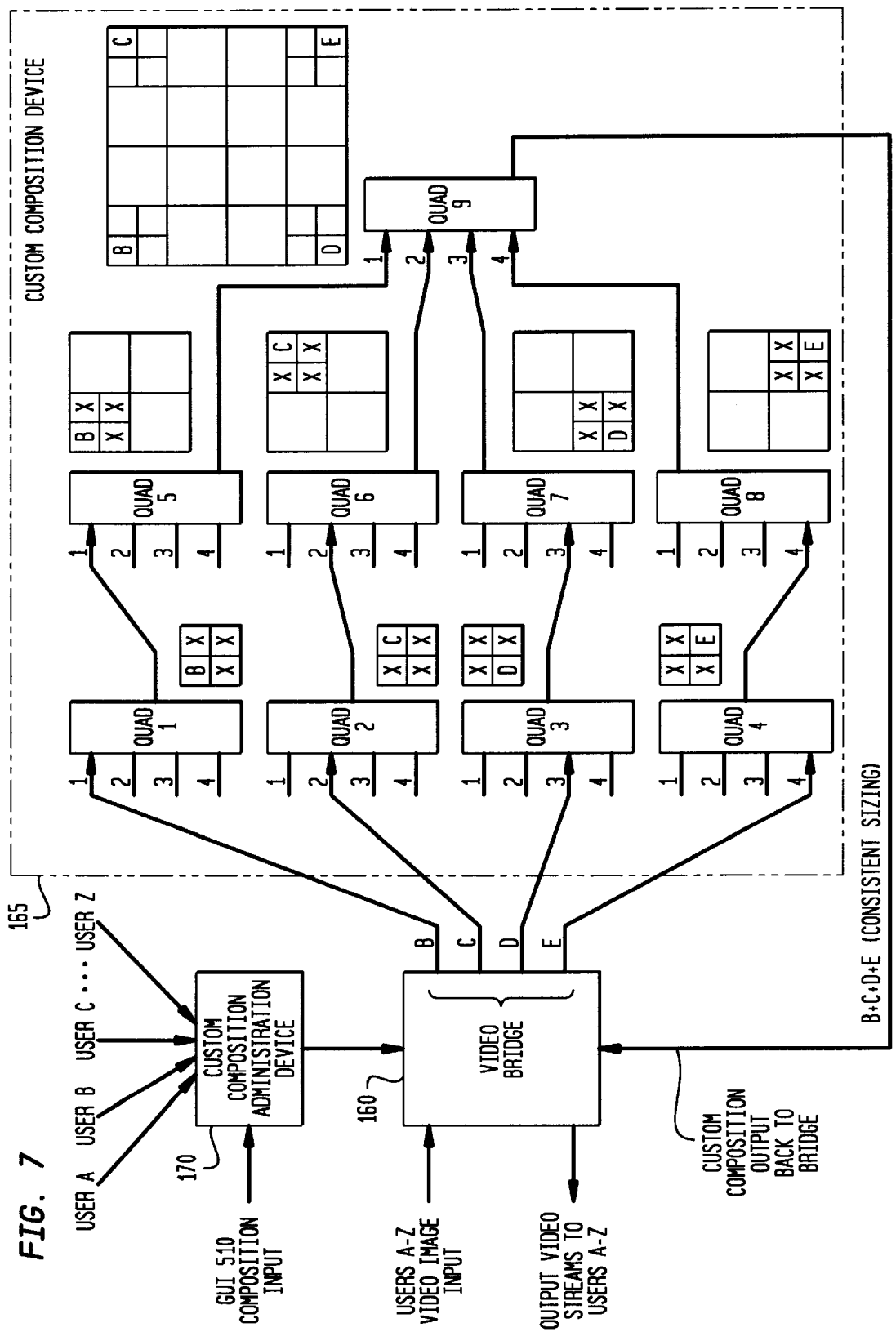
FIG. 7 is a schematic of the architecture and pathing of the instant invention to produce participant images in each corner of a participant's screen.
Figure 8:
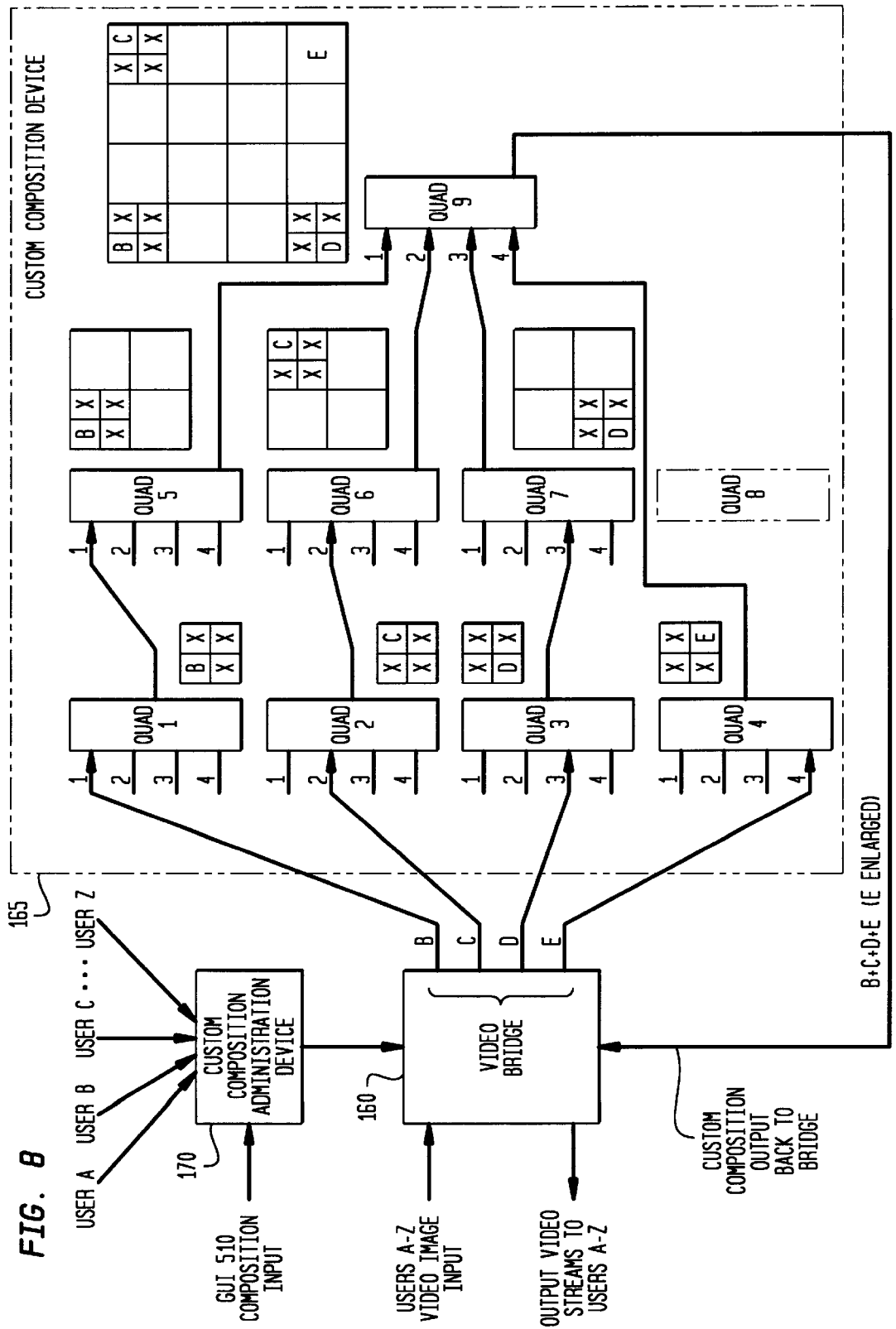
FIG. 8 is a schematic of the architecture and pathing of the instant invention to produce participant images in each corner of a participant's screen in which one of the participants' images is larger than the others.

One final example illustrates further the capability of the instant invention. Rather than placing images along a line, images can be relegated to encroach on screen real estate from each corner. In the most basic configuration, images of users B,C,D&E can be respectively placed in each corner of user A's screen with, for example, the image size set at 1/64th full size. Since the VMS server 700 receives and controls not only video streams but audio streams as well, and those audio streams are likewise identified as output from a specific conferencing station 1–n, in a second embodiment, custom composition administration device 170 is constructed to enlarge a user's image when that user speaks then reduce the image size at some determined time after the audio stream from that user ceases to be active. This is easily accomplished by the custom composition administration device 170 switching the video stream flow between quad boxes from that shown in FIG. 7 to that shown in FIG. 8 and back, assuming that user E is the speaker.

As can be seen, the location of any specific image can be directed to any specific image location in the grid comprised of all potential image locations which can be displayed. Moreover, this can be accomplished in a fashion that causes the image location to be preconfigured. By wiring or otherwise directing a specific video stream always to the same input location in the same quad box and always directing the composite output from that quad box to the same input location in a subsequent quad box, as so forth, the video image carried by that video stream will always remain at the same location in the potential video image location grid. Conversely, by knowing where each input port on a quad box will place an image on screen, this port mapping permits a table to be produced which is referenced by the custom composition administration device 170 to determine on screen image composition.

An overview of the process involved in configuring screen display of user images in the instant invention is illustrated in the flow chart of FIG. 9.

Use of Chroma Keying to Free Screen Real Estate

The composite video stream received by a user's video conferencing station, unless somehow moderated, would occupy the bulk of the receiving user's screen real estate. The present invention novelly recognizes that applying Chroma Keying, a technique well known in the art, to the video stream permits unused image boxes in the composite stream grid to be turned off and this screen real estate is then available to display other data. Hence, if the instant invention were used to align three user images from left to right along the top of the user's screen in 1/16th size as shown in FIG. 4 in the box titled Image Composition Quad 3, those image boxes bearing an "X" are not occupied by a user image. The composing unit 150 uses Chroma Keying to suppress the display of the "X" boxes on the user's screen to free up the screen real estate which would be otherwise occupied to permit a secondary video input to be displayed in the freed up screen real estate. This secondary video input can, for example, be a video display generated by an applications software program.

It has been stated that the GUI 510 and the custom composition administration device 170 establish the size, location and general functioning of the composite image display on each user's screen. It should be clear that the instant invention allows composition of images not only in a linear array—horizontal, vertical, or diagonal—but additional non-linear configurations can be easily created within the constraints of the device. Advantageously, since the instant device and scheme produces a known configuration of images based upon the direction of video streams to specific input ports on quad boxes at one or more cascading levels, a simple table look up is implementable for directing video streams to produce a desired composite image configuration, otherwise known as port mapping.

While the instant invention has been described in terms of a specific configuration, it is recognized and appreciated that the instant invention readily lends itself to other configurations. Likewise, while the instant invention has been described in terms of two specific embodiments, within each embodiment it is recognized and appreciated that various modifications and improvements can be made within the spirit of the invention. For example, while in the preferred embodiments the quad boxes are ganged to one another, each could as easily be connected directly to the video bridge and the video bridge be structured to direct all video streams, including combined video streams, to the proper input port of the next quad box. Likewise, while the image configurations are selectably determined in the preferred embodiments, it is equally easy and within the spirit of the instant invention to simply establish one or more preset configurations for composite image display.

The invention is thus limited only as defined in the accompanying claims.

We claim:

1. A multi-image video composition device resident in a network serving a plurality of user video conferencing stations each having a video screen having screen area, said composition device receiving at least one specific video image stream in analog form, moderating said specific video image stream into a composite image stream in analog form and delivering said composite image stream into the network such that the composite image stream creates an image grid having more than four grid boxes and such that an at least one specific video image carried by the at least one specific video image stream is displayed in a specific one of the more than four grid boxes on a specific user's conferencing station screen, said composition device comprised of:

at least two serially ganged quad boxes, each having four input ports and an output port; and means for selectively directing the at least one specific video image stream along a path through a specific one of said four input ports of each of the at least two serially ganged quad boxes, to create the composite image stream.

2. The video composition device of claim 1 wherein the serially ganged quad boxes create the image grid and control the number of grid boxes.

3. The video composition device of claim 2, wherein the specific grid box in which the at least one specific video image is displayed is determined by the combination of the specific one of said four input ports of each of the at least two serially ganged quad boxes included in the path.

4. The video composition device of claim 3, in which the selectively directing means can controllably alter said path of the at least one specific video image stream to determine a new path through another specific one of said four input ports of each of the at least two serially ganged quad boxes, whereby the at least one specific video image ceases to be displayed in the specific grid box but is instead displayed in a different grid box.

5. The video composition device of claim 4, in which the selectively directing means uses port mapping to determine and controllably alter the path of the at least one specific video image stream.

6. The video composition device of claim 5, also including means for Chroma Keying to turn off the grid boxes other than the boxes in which the at least one specific video image is displayed, whereby the screen area to which the turned off grid boxes would otherwise display is available for display of other video images.

7. The video composition device of claim 6, also comprised of:

means for a user to select a specific grid box in which the at least one specific video image is to be displayed;

means for communicating the user's selection to the directing means; and the directing means including means for determining from the user's selection the number of quad boxes serially ganged and the specific input port on each of serially ganged quad boxes along the path for the at least one specific video image stream to cause the at least one specific video image to be displayed in the specific grid box selected by the user.

8. In a video conferencing system including a display screen, a video image composition device comprised of:

a plurality of quad boxes ganged serially, each quad box having four input ports; and means for directing an analog video stream carrying a video image sequentially along a selectably determined path through said plurality of quad boxes, said path being to a specific one of the said four input ports on each of the plurality of serially ganged quad boxes, whereby the analog video stream becomes part of a composite analog video stream created by the serially ganged quad boxes and the composite analog video stream causes the display screen to display a grid comprised of a plurality of image boxes and the video image appears in a specific one of the plurality of image boxes.

9. The video image composition device of claim 8, wherein the directing means is comprised of:

a port mapping table, each table entry determining a specific image box in which the video image will display by defining the sequence of input ports and the sequence of quad boxes as the path of the analog video stream;

means for selecting a specific table entry;

means for constructing the path consistent with the selected port mapping table entry.

10. The video image composition device of claim 9, including a user interface comprised of:

means for identifying the number of image boxes in the plurality of image boxes and the location of each image box in the grid;

means for selecting a specific image box for display of the video image;

means for communicating to the directing means the specific image box selected.

11. The video image composition device of claim 10, wherein the user interface is further comprised of means for changing the image box selection.

12. The video image composition device of claim 11, including means for delivering the composite analog video stream to a specific screen.

13. An analog image composition device for composing a plurality of video images of users in a video conference such that each video image appears at a determined location on a user's video screen, comprised of:

a plurality of quad boxes ganged serially for creating a display grid comprised of more than four grid boxes on the video screen; and means for directing a specific user video image to a specific desired grid box.

14. The image composition device of claim 13, in which the means for directing a specific user video image to a specific desired grid box includes a means for pathing the video image through the plurality of quad boxes.

15. The image composition device of claim 14, in which each quad box in the plurality of quad boxes has four input ports and said pathing means includes means for selectively determining a specific one of the four input ports of each of said plurality of quad boxes whereby the pathing of the video image is defined.

16. The image composition device of claim 14, in which said directing means includes means for selectively changing the pathing of the video image to cause said specific user video image to be directed to appear in a different specific desired grid box.

17. The image composition device of claim 16 in which the directing means is further comprised of:

a user interface which provides a user the ability to changeably select user video image size and changeably select the specific grid box in which the specific user video image is to appear; and a composition administration device which advises the user interface of the available image sizes for screen display and the grid boxes available for video image display and causes the image composition device to adjust the pathing for said specific user video image based on selections made by the user.

18. The image composition device of claim 17, resident in a communication network supporting the video conference.

* * * * *